United States Patent
Wiese et al.

(10) Patent No.: US 7,596,681 B2
(45) Date of Patent: Sep. 29, 2009

(54) PROCESSOR AND PROCESSING METHOD FOR REUSING ARBITRARY SECTIONS OF PROGRAM CODE

(75) Inventors: Ronald D. Wiese, Austin, TX (US); Nariankadu D. Hemkumar, Austin, TX (US); Sanjay Pillay, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 384 days.

(21) Appl. No.: 11/388,846

(22) Filed: Mar. 24, 2006

(65) Prior Publication Data

US 2007/0239973 A1    Oct. 11, 2007

(51) Int. Cl.
 *G06F 9/40* (2006.01)
(52) U.S. Cl. ..................................... 712/227
(58) Field of Classification Search ................. 712/227
 See application file for complete search history.

(56) References Cited

U.S. PATENT DOCUMENTS

| | | | | |
|---|---|---|---|---|
| 4,551,798 A | * | 11/1985 | Horvath ....................... | 712/243 |
| 5,329,615 A | * | 7/1994 | Peaslee et al. ............... | 345/502 |
| 5,473,557 A | * | 12/1995 | Harrison et al. ............. | 708/520 |
| 5,710,913 A | * | 1/1998 | Gupta et al. ................. | 712/241 |
| 6,175,913 B1 | * | 1/2001 | Chesters et al. ............. | 712/227 |
| 6,370,558 B1 | * | 4/2002 | Guttag et al. ............... | 708/603 |
| 7,272,704 B1 | * | 9/2007 | Nguyen et al. .............. | 712/241 |
| 2004/0039896 A1 | * | 2/2004 | Pechanek .................... | 712/205 |

OTHER PUBLICATIONS

"Coyote Assembly Language Programmer's Guide", 2004, Cirrus Logic, Inc. pp. 46-54.

* cited by examiner

*Primary Examiner*—Eric Coleman
(74) *Attorney, Agent, or Firm*—Andrew M. Harris; Mitch Harris, Atty at Law, LLC

(57) ABSTRACT

A processor and processing method for reusing arbitrary sections of program code provides improved upgrade capability for systems with non-alterable read only memory (ROM) and a more flexible instruction set in general. A specific program instruction is provided in the processor instruction set for directing program execution to a particular start address, where the start address is specified in conjunction with the specific program instruction. An end address is also specified in conjunction with the specific program instruction and the processor re-directs control upon completion of code execution between the start and end address to either another specified address, or to a stored program counter value corresponding to the next instruction in sequence after the specific program instruction. A loop count may also be supplied for repeatedly executing the code between the start and end address until the count has expired.

24 Claims, 4 Drawing Sheets

PROCESSOR AND PROCESSING METHOD FOR REUSING ARBITRARY SECTIONS OF PROGRAM CODE

BACKGROUND OF THE INVENTION

1. Field of the Invention

The present invention relates generally to processors, and more specifically, to a processor and processing method that direct execution to and from an arbitrary section of program code.

2. Background of the Invention

Processing systems are ubiquitous in both computing systems and embedded applications in consumer and industrial devices. Update of so-called read-only program code historically involved replacement of a read-only memory (ROM device) within the computer or other device containing the ROM code. Generally such devices are not field replaceable and return to a service center or factory is required. Masked ROMs are ROMs that are fabricated with a permanent program code and typically provide the lowest-cost and silicon area requirement for providing read-only memory within an integrated circuit.

More recently, electrically alterable read-only memories have been developed and techniques associated with those technologies implemented in software that permit a field modification to ROM devices, thus alleviating the need for factory service to upgrade the ROM program code.

However, several drawbacks are present with the use of electrically alterable memories, including, a limited number of write cycles to failure and limited fail-safe storage lifetimes. Most significantly, larger die areas and higher power requirements compared to masked ROM and the need to program the memories in conjunction with integration make the use of masked ROM preferable to electrically alterable ROM. Also, the technology requirements for electrically alterable ROM technologies is incompatible with some fabrication technologies or otherwise complicates the fabrication process, thus raising the cost when the electrically alterable ROM is included on a die with other circuits.

When program code in ROM is updated, generally only small portions of the full program code set are updated. Therefore, where the behavior of the ROM code is well-bounded, it is possible to use portions of the ROM code from an updated program stored in random access memory (RAM). However, the bounding requirement is that no path through the ROM code can possibly cause execution of any program code instruction that must be replaced in the updated version, severely limiting the flexibility of such ROM code re-use.

Existing processor architectures provide for directing execution of a processor to another memory location not consecutive with the last instruction, in the form of a call or jump (branch) instruction. The distinction between a call or jump instruction is that the call instruction saves the next program counter value, and upon encountering a return instruction, re-directs execution to the stored program counter value. A jump instruction is absolute in that there is no corresponding return instruction. In either case, unless a return instruction is already available at the end of a particular code section in ROM and unless the code in that section is bounded so as not to call or jump to other code that might execute a program instruction that is replaced in an update, existing processor architecture will not support the re-use of that particular code section.

Other known program instruction types provide for looping by executing a portion of program code repeatedly from a loop program instruction to an ending program instruction, with a count that may be specified within the instruction, via an operand or via a register. However, such program instructions do not provide for re-use of ROM program code, because such an instruction located in a particular memory will only loop program instructions immediately following the loop instruction in sequence.

Therefore, it is desirable to provide a processor and processing method for re-using arbitrary sections of program code. It is also desirable in general to extend a processor instruction set for more programming flexibility and program compactness.

SUMMARY OF THE INVENTION

The above stated objectives of re-using arbitrary sections of program code in ROM and providing a more general instruction set for programming flexibility and program compactness is provided in a processor and processing method. The method is a method of operation of the processor.

The processor includes an instruction decoder for decoding an instruction set that includes a specific program instruction that directs program execution to a start address specified in conjunction with the specific instruction. The processor also includes a program control circuit that receives an end address in conjunction with the specific program instruction and directs program execution to another location out of sequence with the current program instruction when the end address is reached.

The specific program instruction thus implements a DO <start> <end> form of program control instruction and may further include a loop counter that causes a repeat of the code between the start and end address for a repetition count. The program instruction may be of the form of a CALL <start> <end> instruction that returns program control to the instruction following the specific program instruction, or the program instruction may implement a JUMP <start> <end> <next PC address> program instruction that directs execution to the start address and then to the "next PC address" when the end address is reached.

The start, end and optional next PC address can be specified in fields of the program instruction, in registers, or as operands, and a repeat counter may be implemented in any of the forms of the instruction.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses a processor and processing method that provide program control for the re-use of arbitrary code sections. Arbitrary, in the context of the present invention, means program code with an arbitrary start and end address in memory. However, it is still necessary to ensure that the program code sections being re-used do not transfer control to those portions memory that are "blacked-out" by the application of the techniques described herein and enabled by the processor of the present invention.

The techniques of the present invention can be applied for "code patching" a read-only memory (ROM) via another code space in RAM that includes instructions as disclosed below, or in general to provide for the flexible re-use of code in any memory. What would ordinarily be a fixed subroutine bounded by one or more entry points and a return instruction can be used with multiple exit points specified at entry. Further, in size-critical code applications, the techniques of the present invention can be used to eliminate the need for the placement of return instructions in the program code.

Figure 1:
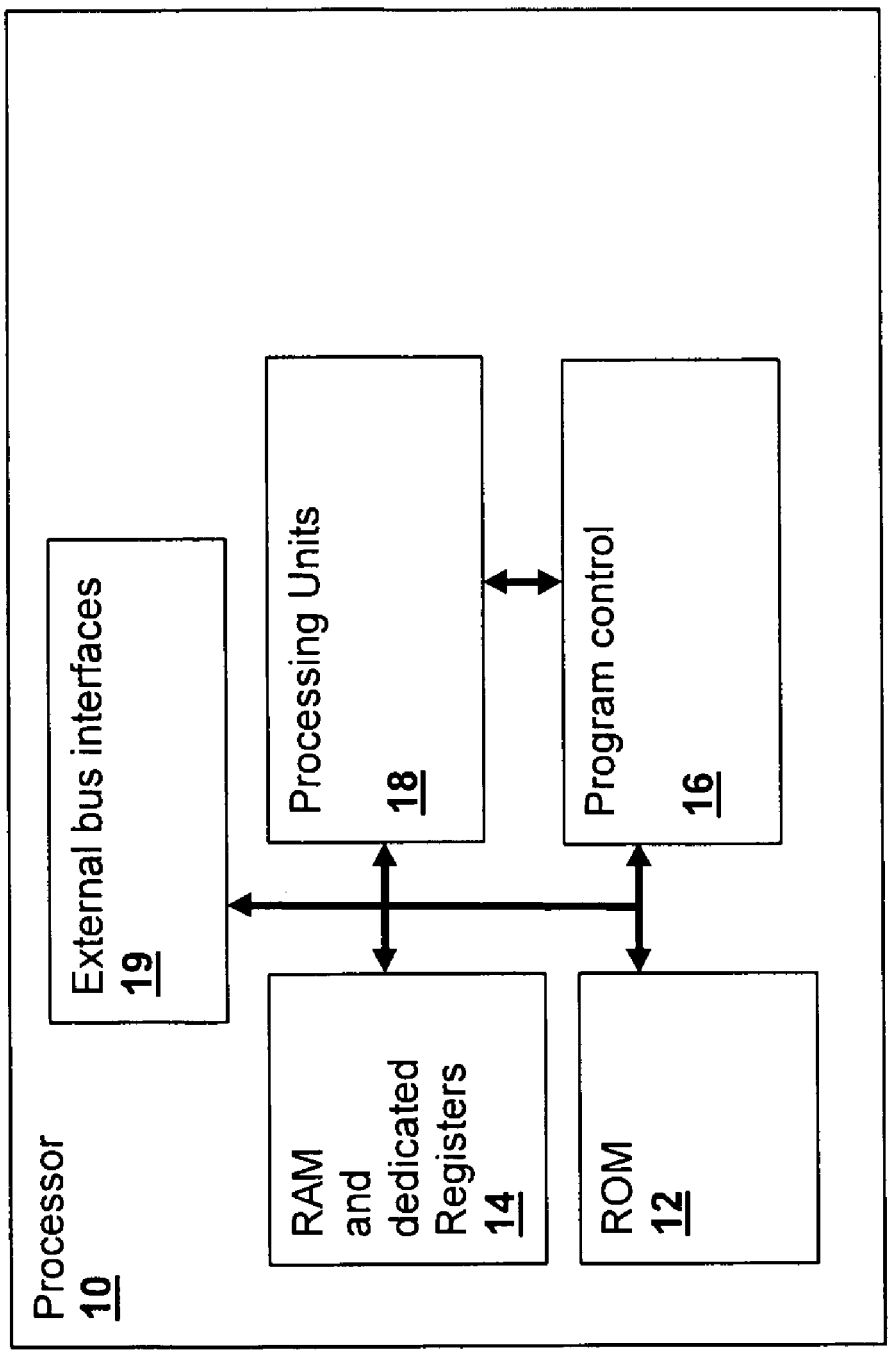
FIG. 1 is a block diagram depicting a processing system including a processor in accordance with an embodiment of the present invention.

Referring now to FIG. 1, a processor 10 in accordance with an embodiment of the present invention is shown. The processor is of the form of a microprocessor or microcontroller suitable for use in embedded applications, such as digital signal processing cores included in larger "system on a chip" type integrated circuits that include other input/output and signal processing functions. In particular, the depicted processor 10 includes a ROM 12 and a random access memory (RAM)/register bank 14 coupled via an internal bus to processing units 18, a program control circuit 16 and external bus interfaces 19. Processor 10 is an exemplary device that embodies one or more of the techniques of the present invention. However, the techniques of the present invention can be used in any application with any type of processor that includes one or more of the improvement described herein.

Program control 16 directs the execution of program instructions that cause processing units 18 to perform various tasks, such as floating-point and fixed-point operations, the loading of values to and from external bus interfaces 19, the loading and storing of program instructions and data to and from RAM 14 and the loading of program instructions from ROM 12. In particular, program control 16 is responsible for the implementation of branching and looping instructions that are loaded from RAM 14 and ROM 12 when encountered in the sequence of execution of program code that is generally sequential in memory until a branch or looping instruction is encountered in the program instruction sequence.

Figure 2:
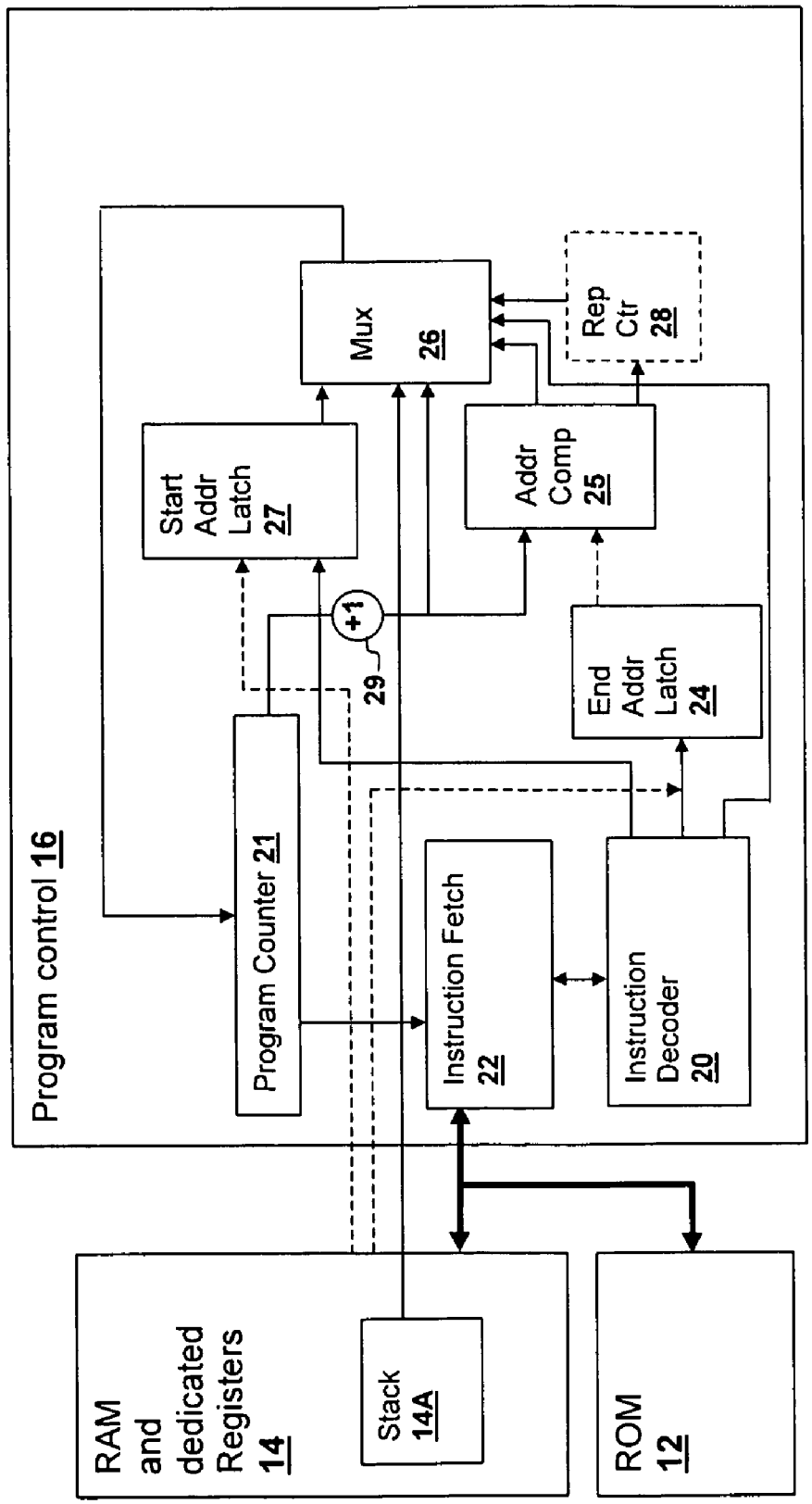
FIG. 2 is a block diagram depicting details of program control 16 within processor 10 of FIG. 1.

Referring now to FIG. 2, details of program control 16 pertinent to the invention are illustrated in a block diagram. A program counter 21 provides the address for loading the next program instruction for execution, and the value loaded is provided by an output of a multiplexer (MUX) 26. The particular value loaded into the program counter is determined in part by control logic that determines when a code section specified by a program instruction in accordance with the processing method of the present invention has completed execution. The default selected input of the multiplexer is the output of an increment 29 of the value stored in program counter 21 and may logically be provided by means other than multiplexer 26, such as via a microcode state machine or a self-adder register used to implement program counter 21. However, no matter what form of logic is used for a default increment, the increment is overridden when at least one of the following events occur: an instruction that redirects program execution is received; or the end address of a program sequence having a specified end address is reached as determined by an address comparator 25.

Each of the above events occur in existing processors and program code; however, the present invention is unique in that the redirect (start) and end address events both are set up to occur in response to the decode of a single program instruction. The end address can be specified as an offset from the start address, or as an absolute value. Instruction decoder 20 receives program instructions from an instruction fetch 22 via an address specified by program counter 21. In the present invention, when a specific program instruction is received for which a start and end address is specified, either by fields within the instruction, operands, or register values within RAM/register bank 14, program execution is redirected to the start address, and the end address is loaded into end address latch 24. End address latch 24 is optional if the end address is held in an accessible stack location that can provide a value for comparison with the current program counter value during program execution.

The start address is loaded from instruction decoder (or from RAM 14 as indicated by the dashed line) into a start address latch 27 and then loaded into program counter 21 via multiplexer 26 under control provided by instruction decoder 20. Start address latch 27 is optional if the start address only has to be loaded once, or if the start address is retained in an accessible stack location, but is otherwise required for looping instructions that also specify a repetition count that is loaded into a rep counter 28. Rep counter 28 may be alternatively provided from an accessible stack location, wherein the value of the field that specifies the repetition count is altered directly by control logic or microcode in order to effect the counting required for the Do instruction.

Rep counter 28 further controls whether the next value of program counter 21 is provided from start address latch 27 causing a repetition or from either a stored program counter that is pushed on a stack 14A when the specific program instruction redirects execution, or from another address value specified in conjunction with the specific program instruction. In the first case, the implementation is that of a Call <start address> <end address> or Do <start address> <end address>, N type instruction that pushes the incremented program counter value, but rather than responding to a return instruction corresponding to the call instruction, address comparator 25 determines when to pop the stored incremented program counter value. In the second case, an instruction of the form JUMP <start> <end> <next address> provides for loading an arbitrary value into program counter after a single pass through or multiple repetitions of the program code extending from the start address to the end address is performed. Table I below illustrates the next program counter value selected by multiplexer 26.

TABLE I

| Condition | Next PC value | Override Behavior at addr = end |
|---|---|---|
| Received non-program control instruction | PC + 1 | if within Called section PC = stored PC stack value |
| Received Call <start><end> | Start Address | |
| Received Do <start><end>, N | Start Address | if within Do section, PC = Start Address count < N |
| Received Jump <start><end><next> | Start Address | if within Jump section, next address or Start address if count < reps |

Stack 14A, in order to provide for the nesting of the program instructions, as well as providing for nesting of the above program instructions with ordinary call and do instructions, needs to not only preserve the program counter value for the next instruction after the Call, Do or Jump instructions described above, but must also preserve the end address and current repetition count/start address if repetition control is present. Also, for the Jump <start><end><next> instruction, the <next> value must be retained.

As mentioned above, the start address may be provided directly to address comparator 25 from a current location in stack 14A, which is generally a dedicated stack for handling the values needed to save the execution states associated with the execution of program instructions of the present invention and with an additional field for identifying a program instruction type, may also store the values needed for saving the states associated with ordinary call and/or do instructions. A single stack location wide enough to hold all the fields required for any individual one of the instructions plus the type field is sufficient.

As an alternative to a stack having an instruction type field, stack 14A may be composed of multiple stacks, as many as one for each type of instruction. In a multi-stack implementation, separate address comparators are used to determine when the program counter reaches, for example, the end of an ordinary Do instruction or the end of a Jump instruction having a specified next address in accordance with an embodiment of the present invention. The stack used to control the nesting of an ordinary Do instruction can also be used to store the values associated with the present invention's Do <start><end>, N instruction, as an ordinary Do stack needs to contain the next address after the Do instruction in order to direct repetition.

Figure 3:
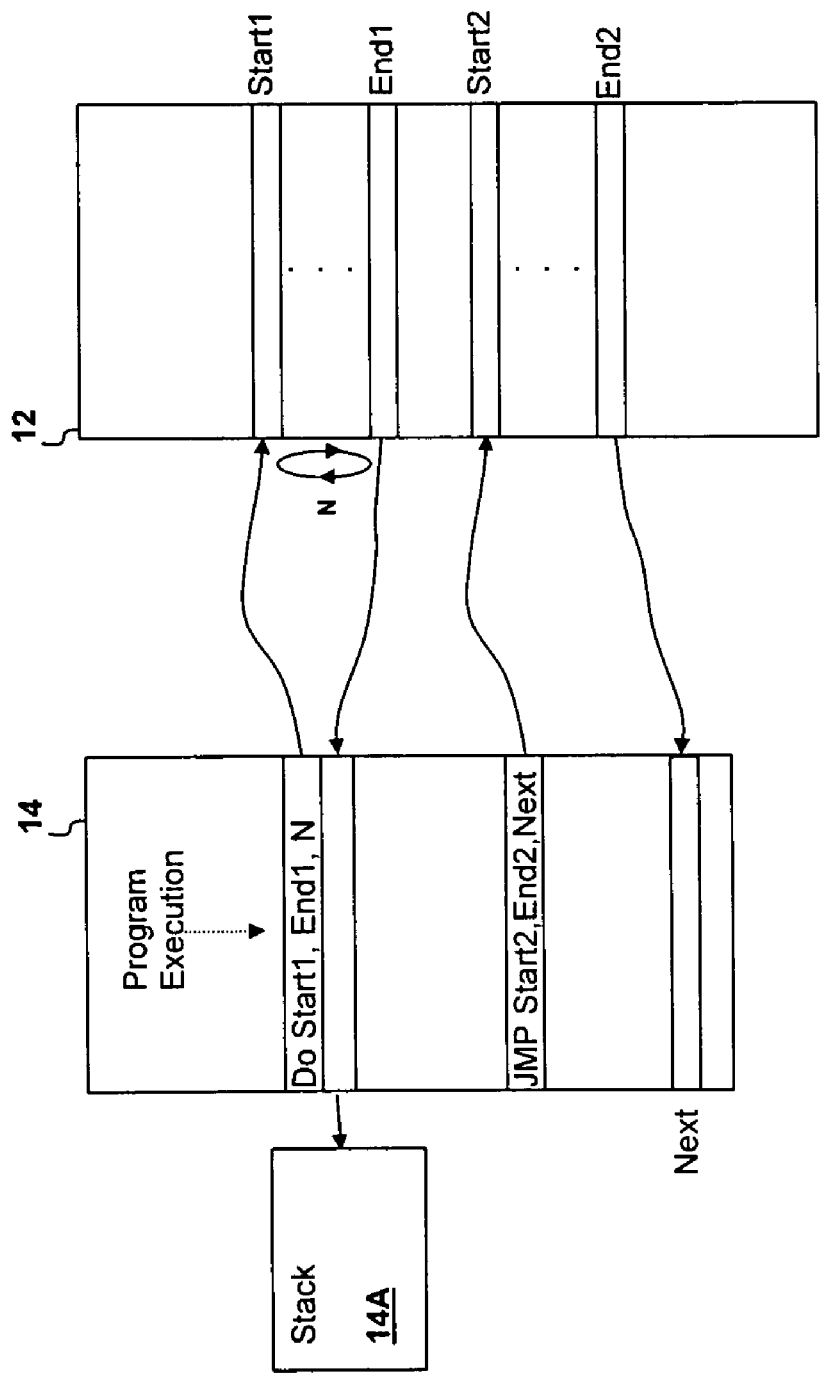
FIG. 3 is an illustration depicting program flow in a processing method in accordance with an embodiment of the present invention.

Referring now to FIG. 3, program control in a processor and according to a processing method in accordance with an embodiment of the invention is shown. Within RAM 14, updated code that re-uses code within ROM 12 is depicted. A Do <Start1> <End1>, N instruction causes the incremented program counter value and the other associated instruction values such as the repetition count, start address to be pushed onto stack 14A and program execution to transfer from RAM 14 to ROM 12 address Start 1. When program execution reaches and completes the instruction at address End1, program control is re-cycled back to address Start1 until N repetitions have occurred, at which point the pushed program counter value is popped off of stack 14A, returning control to the program call immediately following the Do <Start1> <End1>, N in RAM 14.

When program execution reaches the JMP <start2> <End2> <next> instruction, program control transfers to the instruction at address Start2 in ROM 12 and execution proceeds sequentially until the instruction at address End2 is executed, at which time program control transfers to the address specified by Next, which is illustrated as being in RAM 14, but in some circumstances may be useful to transfer to ROM 12 when proper behavior is ensured. In order to use the techniques of the invention as illustrated, the program code between addresses Start1 and End1 and between addresses Start2 and End2 must be well-behaved, meaning that program control will not be transferred to any now invalid code (blacked-out code) in ROM 12. Also, the code section that is entered by one of the above-described instructions should assuredly reach the end address, otherwise the instruction would operate in a manner similar to an ordinary call instruction without an appropriate corresponding return, causing possible stack corruption and possibly mis-directed program execution.

As illustrated, the invention provides a new and useful type of program control that makes it possible to specify a section of code in ROM for re-use, while maintaining total control over where the re-used code will cause execution to transfer, by specifying both a start and an end address and automatically re-directing program execution when the end address is reached. As explained above, current looping instructions, even when provided with a repetition count of 1 cannot perform such a function, as looping instructions do not provide for specifying an arbitrary start address, but rather commence looping at the next program counter location. Current call type instructions would require the presence of a return instruction at the proper location in the ROM code section being re-used, a circumstance that may be possible under specific conditions, but does not provide for re-use of arbitrary code sections in ROM.

The present invention provides for one or more of the following instruction types:

Call <start><end> provides for a single execution of an arbitrary code section.

Do <start><end>, N as illustrated above, provides for repetitive execution of a code section.

Jump <start><end><next> as illustrated above provides for a single execution of an arbitrary code section with subsequent execution directed to another arbitrary address.

Jump <start><end> N <next> as provides for multiple repetitions of an arbitrary code section with subsequent execution directed to another arbitrary address.

Also, without loss of generality, any of the above instructions can be implemented in a conditional form that tests a logical value or other condition before redirecting execution to the start address.

Figure 4:
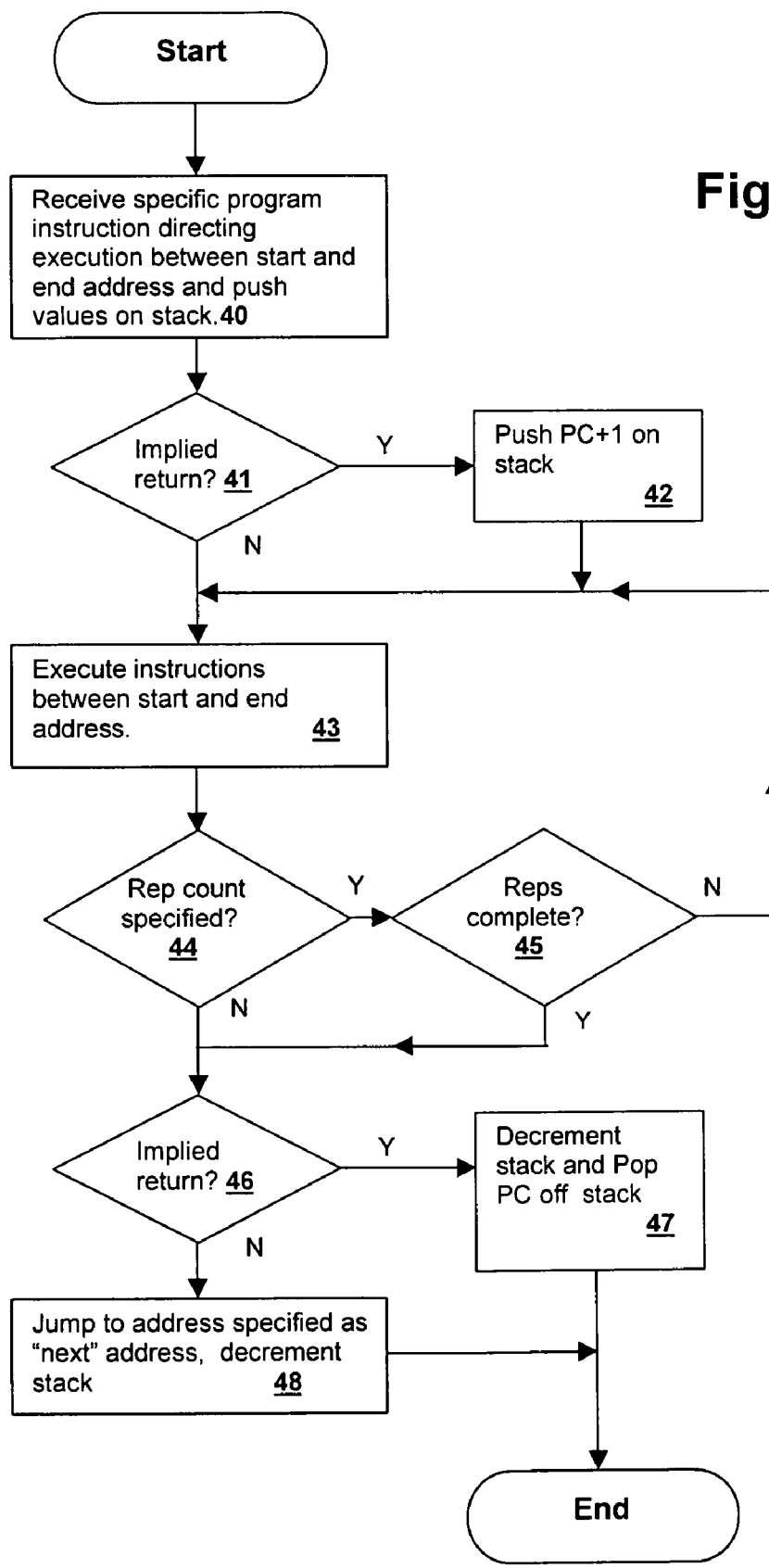
FIG. 4 is a flowchart illustrating a processing method in accordance with an embodiment of the present invention.

Referring now to FIG. 4, a processing method in accordance with an embodiment of the present invention is depicted in a flow chart that describes the behavior of program control 16 of FIG. 2. First, a specific program instruction is received directing execution between a start and end address (step 40) and the necessary values (start/end/count/next) are pushed onto the stack. If there is an implied return address (decision 41), such as in the Call and Do instructions illustrated above, then the incremented program counter value is pushed onto the stack (step 42). Next instructions between the start and end address are executed (step 43) and if a repetition count was specified (decision 44), the count is tested to determine whether the number of repetitions have been met (decision 45). If the number of repetitions has not been met (decision 45), then flow returns to step 43.

If no repetition was specified (decision 44) or once the number of repetitions is complete (decision 45), then the flow proceeds to step 46. If a return point was implied (step 46), the stack is decremented past the stored instruction values (start/end/count/next) and then the previously stored program counter value is popped off the stack (step 47) and execution returns to the instruction following the instruction received in step 40. Otherwise the stack is decremented and program execution jumps to the "next address" specified in conjunction with the program instruction (step 48).

In the implementation of an embodiment of the invention, the address comparisons can be implemented at adjacent addresses, rather than the addresses specified in the description above, in order to perform equivalent program control functions. Such design variations are within the scope of the present invention. For example, the end address could specify the address after the code section and program execution redirected upon program counter increment before execution of the program instruction at the incremented address. Similarly, addresses can be specified in a relative manner with respect to fixed locations in the ROM and RAM memory space or specified in conjunction with an absolute segment register, for example.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A processor for executing program instructions, comprising:
   an instruction decoder for decoding program instructions retrieved from a memory, wherein said program instructions include at least one specific program instruction for specifying that said processor begin sequential execution of program instructions at a start address specified by a field within or an operand or register value provided in conjunction with said specific program instruction and discontinue said sequential execution of program instructions at an end address by another field within or another operand or register value provided in conjunction with said specific program instruction; and
   a program control circuit for controlling execution of said program instructions, wherein said program control unit determines whether a program counter has reached said end address and directs execution to another address out of sequence with said end address in response to determining that said program counter has reached said end address.

2. The processor of claim 1, wherein said end address is specified as an offset from said start address.

3. The processor of claim 1, wherein said program control circuit causes a stack push upon execution of said specific program instruction including at least a program counter value and causes a stack pop upon determining that said program counter has reached said end address, whereby said specific program instruction implements an effective call instruction with an effective corresponding return implemented by said directing execution to said other address out of sequence with said end address.

4. The processor of claim 3, wherein said program control circuit further determines that a loop count provided with said specific program instruction has expired and only causes said stack pop when said loop count has expired and said program counter has reached said end address, and wherein said program control circuit decrements said loop count at each execution of a sequence of program instructions ranging between said start address and said end address.

5. The processor of claim 1, wherein said other address out of sequence with said end address is specified as a next jump address in conjunction with said specific program instruction, wherein said program control circuit directs said execution to said other address in response to determining that said program counter has reached said end address, whereby said program control circuit implements an effective jump to said next jump address out of sequence with said end address.

6. The processor of claim 5, wherein said program control circuit further determines that a loop count provided with said specific program instruction has expired and only directs execution to said next jump address when said loop count has expired and said program counter has reached said end address, and wherein said program control circuit decrements said loop count at each execution of a sequence of program instructions ranging between said start address and said end address.

7. The processor of claim 1, wherein said program control circuit comprises:
   a program counter for specifying a current program address; and
   an address comparator for comparing said current program address with said end address, wherein said address comparator controls a value loaded into said program counter for loading said other address out of sequence with said end address into said program counter in response to determining that said current program address is equal to said end address.

8. The processor of claim 7, wherein said program control circuit further comprises a multiplexer having an output coupled to an input of said program counter for selectively loading a value into said program counter, and wherein an output of said address comparator is coupled to said multiplexer for selecting between said current program address incremented by one and said other address out of sequence with said end address, wherein said current program address incremented by one is selected when said current program address is not equal to said end address.

9. The processor of claim 8, wherein said program control circuit further comprises:
   a storage for storing said start address: and
   a counter for counting a number repetitions of program code extending between said start address and said end address, and wherein said multiplexer has a first input coupled to said program counter, a second input coupled to said storage, and selection logic coupled to said counter wherein said multiplexer selects said start address when said repetition counter indicates that said number of repetitions has not been completed.

10. The processor of claim 9, wherein said multiplexer has a third input coupled to another register for storing a next jump address and wherein said multiplexer selects said next jump address when said current program address is equal to said end address.

11. The processor of claim 9, wherein said multiplexer has a third input coupled to a stack for storing a next program counter value when said specific instruction is decoded, and wherein said multiplexer selects said stored next program counter value when said current program address is equal to said end address.

12. The processor of claim 9, wherein said multiplexer has a fourth input coupled to another register for storing a next jump address, and wherein said multiplexer is further coupled to said instruction decoder for receiving an indication of a type of said specific program instruction when said instruction decoder decodes said program instruction, and wherein said multiplexer selects said next jump address if said specific program instruction is a jump type instruction and selects said stored next program counter value if said specific program instruction is one of a call type and a do type instruction, when said current program address is equal to said end address.

13. A method of managing program control in a processor, comprising:
   decoding program instructions retrieved from a memory, wherein said program instructions include at least one specific program instruction for specifying that said processor begin sequential execution of program instructions at a start address specified by a field within or an operand or register value provided in conjunction with said specific program instruction and discontinue said sequential execution of program instructions at an end address by another field within or another operand or register value provided in conjunction with said specific program instruction;
   in response to said decoding said specific program instruction, directing program execution to said start address, and determining when execution has reached said end address; and in response to determining that program execution has reached said end address, directing program execution to another address out of sequence with said end address.

14. The method of claim 13, wherein said decoding decodes an end address specified as an offset from said start address.

15. The method of claim 13, further comprising:
in response to decoding said specific program instruction, pushing at least a program counter value onto a stack; and
in response to determining that program execution has reached said end address, popping said program counter value off of said stack, whereby said specific program instruction is an effective call instruction with an effective corresponding return implemented by said directing program execution to said other address out of sequence with said end address.

16. The method of claim 15, further comprising:
receiving a loop count value from a result of said decoding; and
counting repetitive execution of program code between said start address and said end address, and wherein said directing program execution directs program execution to said start address before said counting indicates said loop count value has been reached, and pops said program counter value off said stack only when said counting indicates that said loop count value has been reached.

17. The method of claim 13, decoding determines said other address out of sequence with said end address as next jump address specified in conjunction with said specific program instruction, wherein said directing directs program execution to said next jump address in response to determining that program execution has reached said end address.

18. The method of claim 17, further comprising: receiving a loop count value from a result of said decoding: and
counting repetitive execution of program code between said start address and said end address, and wherein said directing program execution directs program execution to said start address before said counting indicates that said loop count value has been reached, and directs execution to said next jump address only when said counting indicates that said loop count value has been reached.

19. A processor for executing program instructions, comprising:
an instruction decoder for decoding program instructions retrieved from a memory, wherein said program instructions include at least one specific program instruction for specifying that said processor begin sequential execution of program instructions at a start address specified by a field within or an operand or register value provided in conjunction with said specific program instruction and discontinue said sequential execution of program instructions at an end address by another field within or another operand or register value provided in conjunction with said specific program instruction; and
a program counter for specifying a current program address;
an address comparator for comparing said current program address with said end address; and
a multiplexer having an output coupled to an input of said program counter for selectively loading a value into said program counter, and wherein an output of said address comparator is coupled to said multiplexer for selecting between said current program address incremented by one and another address out of sequence with said end address, wherein said current program address incremented by one is selected when said current address is not equal to said end address.

20. The processor of claim 19, wherein said multiplexer has an input coupled to a stack for storing a next program counter value when said specific instruction is decoded, and wherein said multiplexer selects said stored next program counter value when said current program address is equal to said end address.

21. A method of directing program execution, comprising:
specifying a arbitrary block of program code having a start address and an end address; and
directing execution to said arbitrary block of program code using a specific program instruction for specifying sequential execution of program instructions within said arbitrary block of program code from said start address to said end address, wherein the start address and the end address are provided by fields within the specific program instruction or operands or register values provided in conjunction with the specific program instruction, and wherein said specific program instruction sets a state of said program execution whereby said sequential execution terminates and execution is re-directed when said sequential execution reaches said end address.

22. the method of claim 21, wherein said directing execution further directs that said arbitrary block of program code be repeated for a number of repetitions, and wherein said execution is re-directed only after said number of repetitions has been performed.

23. The method of claim 21, wherein said execution is re-directed to a next program instruction following said specific program instruction.

24. The method of claim 21, wherein said execution is re-directed to a next program instruction also specified in conjunction with said specific program instruction.

* * * * *